(12) United States Patent
Shimada

(10) Patent No.: US 10,494,975 B2
(45) Date of Patent: Dec. 3, 2019

(54) ENGINE CONTROL APPARATUS

(71) Applicant: TOYOTA JIDOSHA KABUSHIKI KAISHA, Toyota-shi, Aichi-ken (JP)

(72) Inventor: Masanori Shimada, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/111,333

(22) Filed: Aug. 24, 2018

(65) Prior Publication Data
US 2019/0107028 A1 Apr. 11, 2019

(30) Foreign Application Priority Data

Oct. 11, 2017 (JP) .................................. 2017-197871

(51) Int. Cl.
*F01N 9/00* (2006.01)
*F01N 3/20* (2006.01)
*B01D 53/94* (2006.01)

(52) U.S. Cl.
CPC ......... *F01N 9/005* (2013.01); *B01D 53/9495* (2013.01); *F01N 3/2033* (2013.01); *F01N 2900/0601* (2013.01); *F01N 2900/1404* (2013.01); *F01N 2900/1612* (2013.01)

(58) Field of Classification Search
CPC ........ B01D 2257/302; B01D 2258/012; B01D 53/944; B01D 53/9477; B01D 53/9495; F01N 2570/04; F01N 2610/03; F01N 2900/0601; F01N 2900/1404; F01N 2900/1602; F01N 2900/1612; F01N 3/021; F01N 3/0253; F01N 3/035; F01N 3/085; F01N 3/2033; F01N 9/002; F01N 9/005
See application file for complete search history.

(56) References Cited

U.S. PATENT DOCUMENTS

| 6,145,303 A * | 11/2000 | Strehlau | B01D 53/9422 60/274 |
| 2007/0144143 A1* | 6/2007 | Kaneeda | F01N 3/035 60/277 |

FOREIGN PATENT DOCUMENTS

| JP | 2015-169105 | 9/2015 |
| JP | 2017-106381 | 6/2017 |
| WO | WO 2015/132646 | 9/2015 |

* cited by examiner

Primary Examiner — Audrey K Bradley
Assistant Examiner — Anthony Ayala Delgado
(74) Attorney, Agent, or Firm — Finnegan, Henderson, Farabow, Garrett & Dunner, LLP

(57) ABSTRACT

An ECU 30 calculates a target temperature of a bed temperature of a DOC 22a under PM regeneration control at each control period by the elements M1 to M9. Among these elements, the estimating section M7 estimates a passing $SO_3$ amount at each control period by using an inflow SOx amount and a representative temperature. The estimating section M8 estimates a $SO_2$ reduction rate, which is a ratio of reduction from $SO_3$ to $SO_2$ in the DOC 22a. Then, the calculating unit M9 calculates an amount of $SO_3$ that is allowed to desorb from the DOC 22a as an allowable desorption $SO_3$ amount at each control period, by using a constrained $SO_3$ amount which corresponds to a constraint concerning sulfate white smoke, the passing $SO_3$ amount, and the $SO_2$ reduction rate.

6 Claims, 11 Drawing Sheets

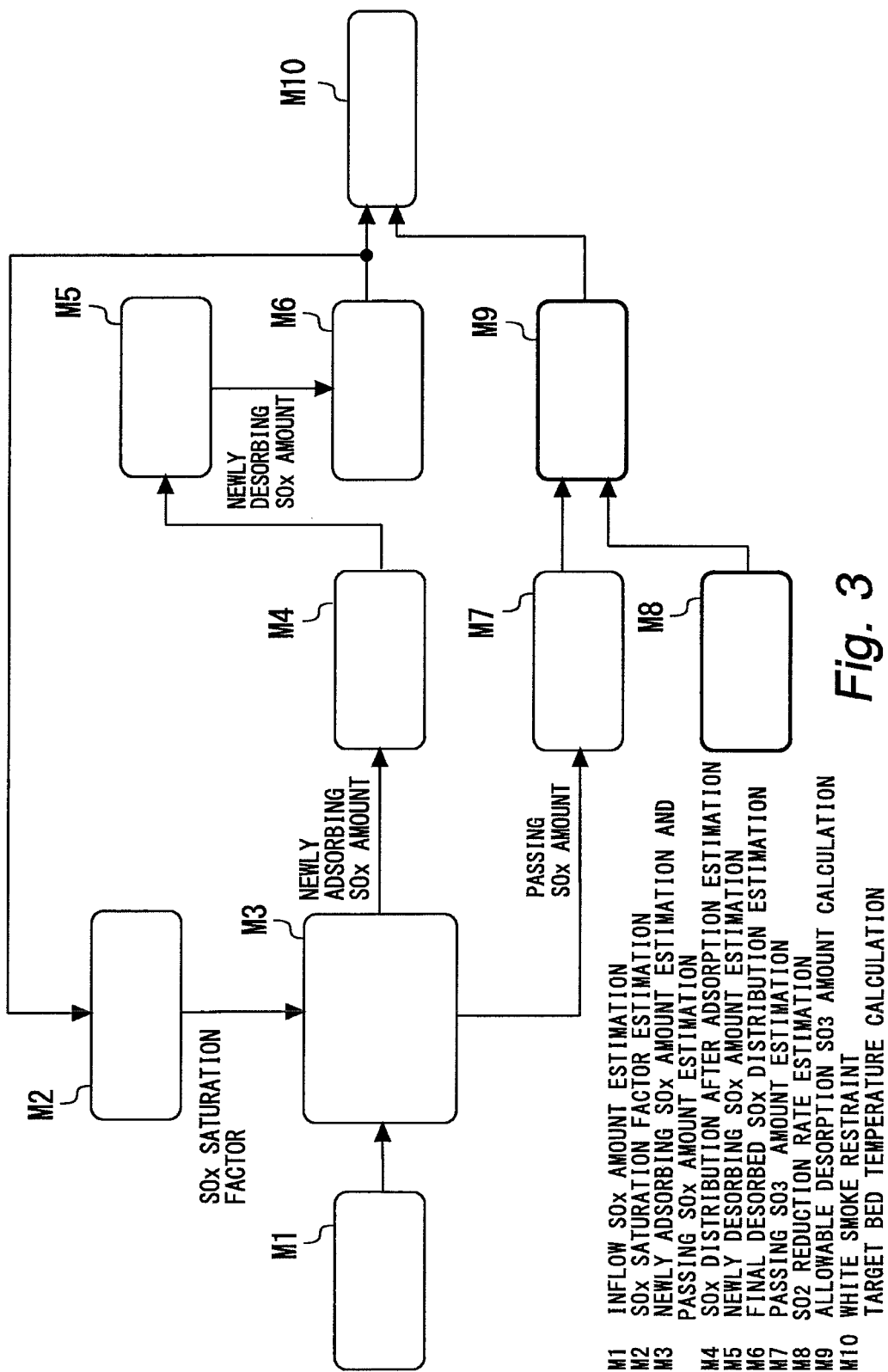

Fig. 3

M1  INFLOW SOx AMOUNT ESTIMATION
M2  SOx SATURATION FACTOR ESTIMATION
M3  NEWLY ADSORBING SOx AMOUNT ESTIMATION AND PASSING SOx AMOUNT ESTIMATION
M4  SOx DISTRIBUTION AFTER ADSORPTION ESTIMATION
M5  NEWLY DESORBING SOx AMOUNT ESTIMATION
M6  FINAL DESORBED SOx DISTRIBUTION ESTIMATION
M7  PASSING SO3 AMOUNT ESTIMATION
M8  SO2 REDUCTION RATE ESTIMATION
M9  ALLOWABLE DESORPTION SO3 AMOUNT CALCULATION
M10 WHITE SMOKE RESTRAINT TARGET BED TEMPERATURE CALCULATION

ENGINE CONTROL APPARATUS

FIELD

The present disclosure relates to an engine control apparatus, and more particularly relates to a control apparatus for a diesel engine including a catalyst in an exhaust pipe.

BACKGROUND

Conventionally, temperature increase control has been known in which sulfur oxides (referring to $SO_2$ or $SO_3$, and will be generically referred to as "SOx" when sulfur oxides are not discriminated hereinafter) are regularly desorbed from the catalyst provided in the exhaust pipe of a diesel engine. JP 2017-106381 A is a literature relating to such temperature increase control, for example. This literature discloses a technique for estimating an SOx amount discharged from the catalyst in the state of $SO_3$ by modeling the reaction of SOx in catalyst. $SO_3$ becomes mist by dissolving in H2O, and it is visually recognized as sulfate white smoke. In the above technique, the target bed temperature of the catalyst is determined so that the amount of $SO_3$ discharged from the catalyst estimated by the model operation does not conflict with the constraint on sulfate white smoke.

Following is a list of patent literatures which the applicant has noticed as related arts of embodiments the present disclosure.

Patent Literature 1: JP2017-106381A
Patent Literature 2: JP2015-169105A

SUMMARY

Specifically, in the technique of the above publication, a reaction in which SOx flowing into the catalyst adsorbs and desorbs to the catalyst and a reaction in which $SO_2$ is oxidized and converted to $SO_3$ among SOx that passes through the catalyst are modeled. However, SOx reaction in the catalyst is not only adsorption/desorption to the catalyst or oxidation reaction of $SO_2$. That is, when fuel is added to the exhaust in catalyst temperature increase control, reduction reaction from $SO_3$ to $SO_2$ occurs in the catalyst. In the technique of the above publication, the reduction reaction of $SO_3$ at the catalyst is not modeled. For this reason, according to the technique of the above publication, there is a fear that the SOx amount discharged from the catalyst in the state of $SO_3$ is estimated to be larger than the actual SOx amount. In this case, since the target bed temperature of the catalyst is set to be lower than an actual allowable temperature, the temperature increase control period is prolonged and the fuel consumption is deteriorated.

The present disclosure has been made in view of the above-described problems. It is an object of the present disclosure to provide an engine control apparatus capable of suppressing prolongation of a temperature increase control in a catalyst while suppressing generation of white smoke caused by desorbed SOx, by considering a reduction reaction in the catalyst in the temperature increase control.

In order to solve the above described problem, a present disclosure is an engine control apparatus including a purifying device provided in an exhaust pipe of a diesel engine, a fuel adding valve for supplying unburnt fuel into the purifying device, and an electronic control unit that executes temperature increase control of increasing a temperature of the purifying device to a target temperature in a temperature range in which a particulate matter burns by supplying unburnt fuel from the fuel adding valve. The electronic control unit including a temperature acquiring section, an inflow SOx amount estimating section, a final adsorbed SOx distribution estimating section, a passing $SO_3$ amount estimating section, an $SO_2$ reduction rate estimating section, an allowable desorption $SO_3$ amount calculating section, and a target temperature calculating section. The temperature acquiring section acquires a representative temperature that is a representative value of the purifying device at each predetermined control period. The inflow SOx amount estimating section estimates an amount of SOx flowing into the purifying device as an inflow SOx amount at each control period. The final adsorbed SOx distribution estimating section estimates a final adsorbed SOx distribution by using the inflow SOx amount and the representative temperature at each control period, the final adsorbed SOx distribution expressed as a graph in which an amount of SOx that finally adsorbs to the purifying device in each temperature during temperature increase of the purifying device is related with the representative temperature. The passing $SO_3$ amount estimating section estimates an amount of SOx that flows into the purifying device in a state of SOx and passes without adsorbing to the purifying device to be converted in a state of $SO_3$ as a passing $SO_3$ amount at each control period, by using the inflow SOx amount and the representative temperature. The $SO_2$ reduction rate estimating section estimates a $SO_2$ reduction rate which is a ratio of reduction of $SO_3$ to $SO_2$ in the purifying device. The allowable desorption $SO_3$ amount calculating section calculates an amount of $SO_3$ that is allowed to desorb from the purifying device as an allowable desorption $SO_3$ amount at each control period, by using a constrained $SO_3$ amount at a downstream side of the purifying device, which corresponds to a constraint concerning sulfate white smoke, the passing $SO_3$ amount, and the $SO_2$ reduction rate. And the target temperature calculating section calculates the target temperature at each control period, by using the final adsorbed SOx distribution and the allowable desorption $SO_3$ amount.

In the present disclosure, the $SO_2$ reduction rate estimating section may be configured to estimate the $SO_2$ reduction rate based on a relation between the $SO_2$ reduction rate, a supplied amount of unburnt fuel from the fuel adding valve, and a gas amount flowing into the purifying device.

In the present disclosure, the passing $SO_3$ amount estimating section may be configured to estimate a SOx saturation factor in the purifying device at each control period, by using an adsorbed SOx distribution expressed as a graph in which an amount of SOx that adsorbs to the purifying device in each temperature during temperature increase of the purifying device is related with the representative temperature of the purifying device and a saturation SOx distribution expressed as a graph in which an SOx maximum amount adsorbing to the purifying device in each temperature during temperature increase of the purifying device is related with the temperature of the purifying device, estimate an amount of SOx that flows into the purifying device and newly adsorbs to the purifying device as a newly adsorbing SOx amount at each control period by using the inflow SOx amount and the SOx saturation factor, estimate an amount of SOx that flows into the purifying device and passes without adsorbing to the purifying device as a passing SOx amount, by using the newly adsorbing SOx amount, and estimate the passing $SO_3$ amount at each control period, by using a conversion rate map expressing a relation between a conversion rate of $SO_2$ that is converted into $SO_3$ in the purifying device and the representative temperature.

In the present disclosure, the final adsorbed SOx distribution estimating section may be configured to estimate an amount of SOx that newly desorbs from the purifying device as a newly desorbing SOx amount at each control period, by using the inflow SOx amount and the representative temperature, and estimate the final adsorbed SOx distribution at each control period, by using the newly desorbing SOx amount.

In the present disclosure, the temperature acquiring section may be configured to acquire a gas temperature at a downstream side of the purifying device as the representative temperature.

In the present disclosure, the purifying device may include a filter that traps particulate matter flowing in the exhaust pipe. The electronic control unit may be configured to start the temperature increase control when an estimated value of an amount of particulate matter trapped by the filter reaches a removal request amount.

According to the present disclosure, in the calculation of the allowable desorption $SO_3$ amount, the constrained $SO_3$ amount downstream of the purifying device corresponding to the constraint on sulfate white smoke, the passing $SO_3$ amount, and the $SO_2$ reduction rate which is the rate of reduction from $SO_3$ to $SO_2$ are considered. When the $SO_2$ reduction rate is taken into account, the estimation accuracy of the allowable desorption $SO_3$ amount can be improved more than when the $SO_2$ reduction rate is not considered. Thereby, the target temperature for the temperature increase control can be brought close to the actually allowed bed temperature, so that it is possible to suppress the prolongation of the temperature increase control while suppressing the generation of white smoke caused by the desorbed SOx.

BRIEF DESCRIPTION OF DRAWINGS

FIG. 2 is a diagram for describing adsorption and desorption of SOx in a DOC 22a;

FIG. 3 is a functional block diagram showing a logic for calculating a target bed temperature Ttrg;

DESCRIPTION OF EMBODIMENTS

Hereinafter, an embodiment of the present disclosure will be described with reference to the drawings. Note that when the numerals of the numbers, the quantities, the amounts, the ranges and the like of the respective elements are mentioned in the embodiment shown as follows, the present disclosure is not limited to the mentioned numerals unless specially explicitly described otherwise, or unless the disclosure is explicitly specified by the numerals theoretically. Further, structures, steps and the like that are described in the embodiment shown as follows are not always indispensable to the present disclosure unless specially explicitly shown otherwise, or unless the disclosure is explicitly specified by them theoretically.

First Embodiment

A first embodiment will now be described referring to the accompanying drawings.

1. Explanation of System Configuration

Figure 1:
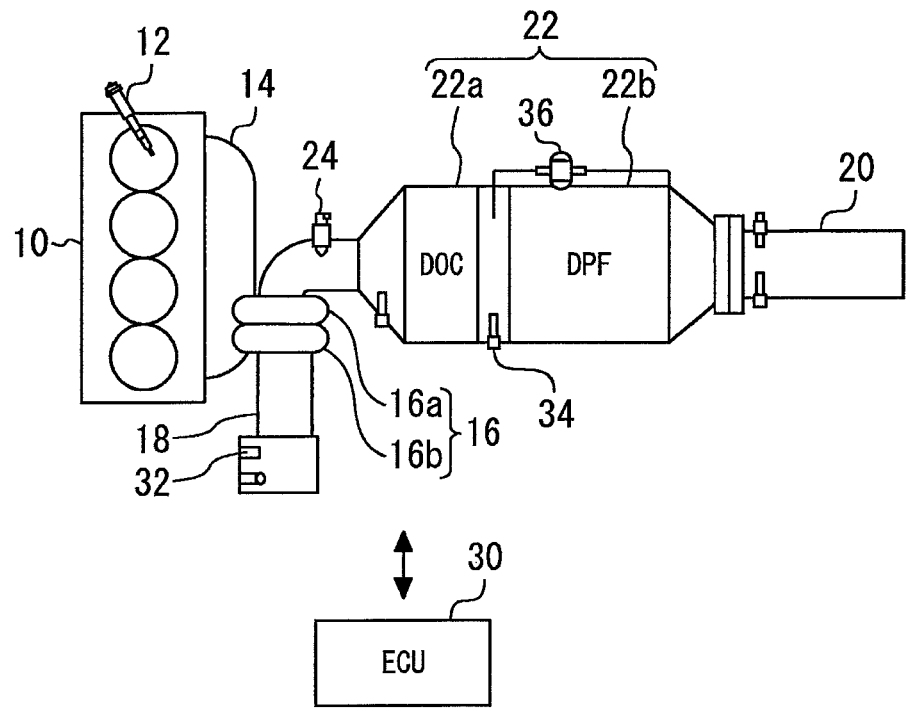
FIG. 1 is a diagram showing a system configuration of an embodiment of the present disclosure.

FIG. 1 is a diagram showing a system configuration of an embodiment. The system shown in FIG. 1 is configured as an engine control apparatus including a diesel engine 10 (also simply referred to as "an engine 10" hereinafter) which is mounted on a vehicle. Respective cylinders of the engine 10 are provided with injectors 12 that inject light oil as fuel. The engine 10 drawn in FIG. 1 is an in-line four-cylinder engine, but the number of cylinders and arrangement of the cylinders of the engine 10 are not specially limited. Further, only one of the four injectors 12 is drawn in FIG. 1.

An inlet of an exhaust turbine 16a of a turbocharger 16 is connected to an exhaust manifold 14 of the engine 10. The exhaust turbine 16a is connected to a compressor 16b which is provided in an intake pipe 18. The compressor 16b turbocharges intake air by driving by rotation of the exhaust turbine 16a. An exhaust pipe 20 is connected to an outlet of the exhaust turbine 16a. The exhaust pipe 20 is provided with an exhaust emission purifying device 22. The exhaust emission purifying device 22 includes a DOC (Diesel Oxidation Catalyst) 22a, and a DPF (Diesel Particulate Filter) 22b. The DOC 22a is a catalyst having a function of oxidizing hydrogen carbon (HC) and a carbon monoxide (CO) in exhaust emission and converting HC and CO into water ($H_2O$) and a carbon dioxide ($CO_2$). The DPF 22b is a filter that traps particulate matter (PM) contained in exhaust emission. A fuel adding valve 24 that adds unburnt fuel common to the injector 12 to the exhaust pipe 20 is provided upstream of the exhaust emission purifying device 22. The fuel adding valve 24 is an example of a fuel supplying means.

The system shown in FIG. 1 includes an ECU (Electronic Control Unit) 30 as a control means. The ECU 30 is a microcomputer including a RAM (Random Access Memory), a ROM (Read Only Memory), a CPU (Central Processing Unit) and an input-output interface. The ECU 30 takes in signals from various sensors which are mounted on the vehicle through the input-output interface and processes the signals. The various sensors include an air flow meter 32 that is provided in a vicinity of an inlet of the intake pipe 18, a temperature sensor 34 that detects an outlet temperature of the DOC 22a, and a differential pressure sensor 36 that detects a pressure difference between an upstream and downstream sides of the DPF 22b. The ECU 30 processes the signals from the various sensors which the ECU 30 takes in and operates various actuators in accordance with a predetermined control program. The actuators operated by the ECU 30 include the injector 12 and the fuel adding valve 24 described above.

2. Regeneration Control of DPF 22b

In the present embodiment, temperature increase control (also referred to as "PM regeneration control" hereinafter) of the DPF 22b is performed as engine control by the ECU 30. PM regeneration control is control that adds fuel from the fuel adding valve 24 when an estimated value of PM which is trapped by the DPF 22b reaches a removal request amount. For example, when the pressure difference detected by the differential pressure sensor 36 reaches a predetermined value, it can be determined that the estimated value of PM reaches the removal request amount. Fuel is added from the fuel adding valve 24, whereby the added fuel is oxidized in the DOC 22a, and a bed temperature of the DPF 22b is increased to 600° C. or more by oxidation reaction heat. Thereby, PM which is trapped by the DPF 22b can be burned and removed, and therefore, the trapping function of the DPF 22b can be restored. An addition fuel amount (hereinafter, "a DPF fuel amount") from the fuel adding valve 24 for increasing the bed temperature of the DPF 22b to 600° C. or more is determined on the basis of a map that relates the addition fuel amount with the bed temperature of the DPF. The map like this is stored in the ROM of the ECU 30, for example, and can be properly read in accordance with an actual bed temperature of the DPF 22b.

3. Problem in PM Regeneration Control

Incidentally, a sulfur is generally contained in fuel and a lubricating oil of a diesel engine, and with combustion of the fuel, SOx is generated from the sulfur like this. This similarly applies to the present embodiment, and SOx is generated with combustion of fuel in the engine 10. The generated SOx is discharged from the engine 10 to flow into the exhaust emission purifying device 22, and mainly adsorbs to the DOC 22a. However, when the bed temperature of the DOC 22a becomes high, the SOx adsorbing to the DOC 22a starts to desorb. Although there is variations depending on a composition of the DOC 22a and the like, SOx desorbs from the DOC 22a and is released to a downstream side, in a temperature range in which PM regeneration control is performed.

Figure 2:
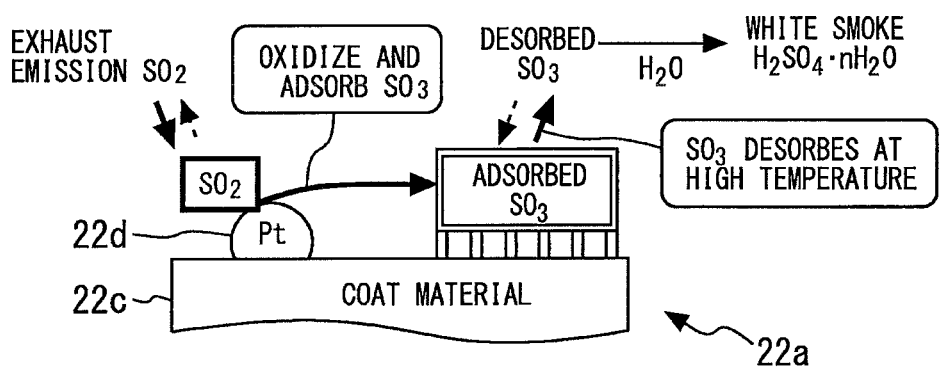

Adsorption and desorption of SOx in the DOC 22a will be described with reference to FIG. 2. FIG. 2 is a diagram for describing adsorption and desorption of SOx in a DOC 22a. As shown in FIG. 2, the DOC 22a includes a coat material 22c that covers a surface of a base material (not illustrated), and a precious metal 22d (Pt, Pd or the like). The precious metal 22d is dispersively supported by the coat material 22c, and is an active spot at a time of oxidizing HC and CO. Note that $SO_2$ in exhaust emission adsorbs to the precious metal 22d, or $SO_3$ in the exhaust emission adsorbs to the coat material 22c. A part of $SO_2$ adsorbing to the precious metal 22d desorbs from the precious metal 22d to return into the exhaust emission, or is oxidized on the precious metal 22d to be $SO_3$, and adsorbs to the coat material 22c in a state of $SO_3$. That is, $SO_2$ adsorbs to the precious metal 22d, and $SO_3$ derived from exhaust emission and $SO_3$ derived from $SO_2$ adsorb to the coat material 22c. In any event, as a result that SOx is adsorbed, the function of oxidizing HC and the like in the DOC 22a is inhibited.

The $SO_3$ adsorbing to the coat material 22c by the aforementioned two routes is desorbed when the bed temperature of the coat material 22c becomes high. Further, as a result that the bed temperature of the coat material 22c becomes high, conversion from $SO_2$ to $SO_3$ is promoted on the precious metal 22d, and therefore, $SO_3$ like this is also desorbed from the coat material 22c. Accordingly, not only the trapping function of the DPF 22b described above but also the function of oxidizing HC and the like in the DOC 22a can be restored, by performing PM regeneration control. However, as shown in FIG. 2, the $SO_3$ which is desorbed from the coat material 22c reacts with $H_2O$ that exists in the exhaust pipe 20, whereby $H_2SO_4$ is generated. When a concentration of the $H_2SO_4$ exceeds a fixed concentration, $H_2SO_4$ becomes white smoke (sulfate white smoke) which is visually recognizable, and therefore is likely to impair a commodity value of the vehicle on which the engine 10 is mounted.

4. Temperature Control of DOC 22a

If fuel is added from the fuel adding valve 24 so that a concentration of $H_2SO_4$ in the exhaust emission which is downstream of the DOC 22a does not become excessively high, generation of sulfate white smoke in PM regeneration control can be restrained. Thus, the ECU 30 of the present embodiment calculates a concentration of $SO_3$ by using a control model. The ECU 30 calculates a target temperature (hereinafter, also referred to as "a target bed temperature Ttrg") of the bed temperature of the DOC 22a under PM regeneration control so that a concentration of $SO_3$ at a downstream side of the DOC 22a satisfies a constraint concerning sulfate white smoke. A constraint $SO_3$ concentration (an upper limit value of the $SO_3$ concentration at the downstream side of the DOC 22a) like this can be stored in the ROM of the ECU 30, for example.

The ECU 30 calculates a fuel amount to be added from the fuel addition valve 24 based on the target bed temperature Ttrg. In the following explanation, the fuel amount for realizing the target bed temperature Ttrg will be referred to as "a constraint satisfying fuel amount". When the DPF fuel amount is larger than the constraint satisfying fuel amount, the constraint satisfying fuel amount is adopted instead of the DPF fuel amount. This makes it possible to restore the function of oxidizing HC and the like in the DOC 22a while satisfying the constraint on the sulfate white smoke.

5. Feature of Present Embodiment

The inventor of the present application keenly studied on the SOx reaction at the DOC 22a under PM regeneration control. Then, the inventor noticed that not only the oxidation reaction from $SO_2$ to $SO_3$ but also the reduction reaction from $SO_3$ to $SO_2$ actively occurred in the DOC 22a under PM regeneration control. As in the conventional technique, in the control model not considering the reduction reaction, the amount of $SO_3$ discharged from the DOC 22a is calculated more than it actually is. As a result, the target bed temperature Ttrg is set to a temperature lower than an actually allowed bed temperature. In this case, the execution period of PM regeneration control is prolonged, resulting in deterioration of fuel efficiency.

In the system of the present embodiment, the reduction reaction of $SO_3$ at the DOC 22a under PM regeneration control is included in the control model. As a result, the estimation accuracy of the amount of $SO_3$ discharged from the DOC 22a can be increased, so that the target bed temperature Ttrg can be brought close to the actually allowed bed temperature. As a result, it is possible to suppress the execution period of the PM regeneration control from prolonging, so that deterioration of fuel economy is suppressed. Hereinafter, the calculation logic of the target bed temperature Ttrg executed in the system of the present embodiment will be described in detail.

6. Calculation Logic of Target Bed Temperature Ttrg

FIG. 3 is a functional block diagram showing a logic for calculating the target bed temperature Ttrg, and this is realized by the ECU 30. As shown in FIG. 3, the ECU 30 includes an inflow SOx amount estimating section M1, a SOx saturation factor estimating section M2, a newly adsorbing SOx amount and passing SOx amount estimating section M3, a SOx distribution after adsorption estimating section M4, a newly desorbing SOx amount estimating section M5, a final adsorbed SOx distribution estimating section M6, a passing $SO_3$ amount estimating section M7, an $SO_2$ reduction rate estimating section M8, an allowable desorption $SO_3$ amount calculating section M9, and a white smoke restraint target bed temperature calculating section M10, and calculates the target bed temperature Ttrg at each control period (more specifically, at each combustion cycle of the engine 10) by these elements M1 to M9. In the following explanation, the elements M1 to M9 will be simplified, and for example, the inflow SOx amount estimating section M1 will be also referred to as "the estimating section M1".

The estimating section M1 estimates an amount of SOx (hereinafter, also referred to as "an inflow SOx amount") that flows into the DOC 22a. Note that "SOx that flows into the DOC 22a" mentioned in the present description includes not only SOx which is generated in the engine 10, and is discharged from the engine 10 to flow into the DOC 22a, but also SOx which is generated with an oxidation reaction in the DOC 22a, of the fuel added from the fuel adding valve 24 and flows on the DOC 22a.

The estimating section M1 specifically estimates the inflow SOx amount in a $t^{th}$ cycle by formula (1) as follows having an injection fuel amount (an in-cylinder injection amount) from the injectors 12 and an added fuel amount (exhaust emission addition amount) from the fuel adding valve 24 as variables. A fuel S concentration in formula (1) is a sulfur concentration in fuel, and a detection value of a sulfur concentration sensor which is additionally provided in a fuel supply system may be used, or a set value may be used.

$$\text{Inflow SOx amount(exhaust emission addition amount}(t),\text{incylinder injection amount}(t))\ [\mu g/s] \\ = \text{inflow fuel amount(exhaust emission addition amount}(t),\text{incylinder injection amount}(t))\ [g/s] \times \text{fuel } S \text{ concentration [ppm]} \quad (1)$$

The inflow fuel amount (the exhaust emission addition amount (t), the in-cylinder injection amount (t)) in formula (1) is an amount in the $t^{th}$ cycle of the fuel from which "SOx flowing into the DOC 22a" is derived, and is calculated from formula (2) as follows by using a specific gravity (light oil specific gravity) of the fuel.

$$\text{Inflow SOx amount(exhaust emission addition amount}(t),\text{incylinder injection amount}(t))\ [g/s] = \\ (\text{exhaust emission addition amount}(t)\ [g/s]/ \\ 1000 \times \text{light oil specific gravity [g/cm}^3] + \text{incylinder injection amount}(t)\ [g/s]) \quad (2)$$

In the following explanation, the inflow SOx amount (exhaust emission addition amount (t), in-cylinder injection amount (t)) will be also referred to as an inflow SOx amount (t). Further, the inflow fuel amount (exhaust emission addition amount (t), in-cylinder injection amount (t)) will be also referred to as an inflow fuel amount (t).

The estimating section M2 estimates a saturation factor of SOx (hereinafter, also referred to as "a SOx saturation factor") in the DOC 22a. In estimation of the SOx saturation factor, a distribution (hereinafter, also referred to as "an adsorbed SOx distribution") which is expressed as a graph in which an amount of SOx (hereinafter, also referred to as "an adsorbed SOx amount") adsorbing to the DOC 22a in each of bed temperatures in increase of the bed temperature of the DOC 22a is related with the bed temperature of the DOC 22a, and a distribution (hereinafter, also referred to as "a saturation SOx distribution") which is expressed as a graph in which a maximum amount of SOx (hereinafter, also referred to as "a saturation SOx amount") adsorbing the DOC 22a in each of the bed temperatures in increase of the bed temperature of the DOC 22a is related with the bed temperature of the DOC 22a are used. First, the adsorbed SOx distribution and the saturation SOx distribution will be described with reference to FIG. 4 with $SO_3$ as an example.

Figure 4:
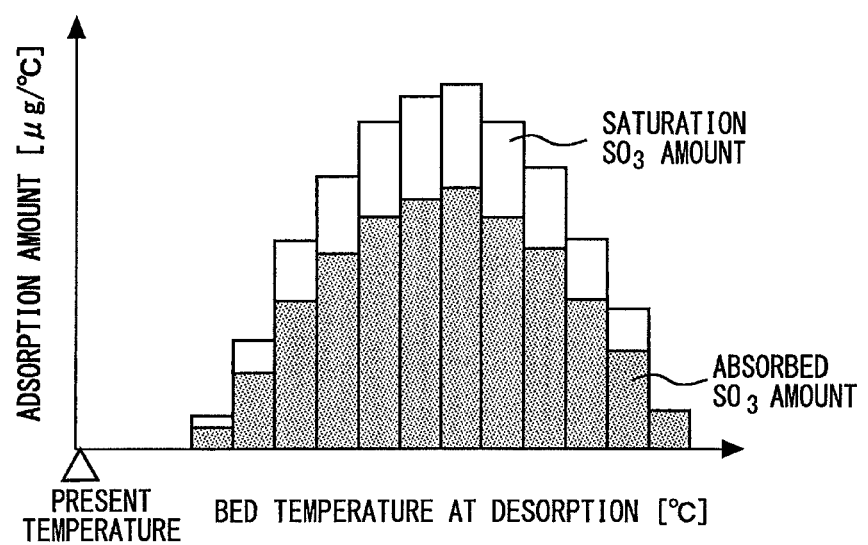
FIG. 4 is a diagram for describing an adsorbed SOx distribution and a saturation SOx distribution.

FIG. 4 is a diagram for describing an adsorbed SOx distribution and a saturation SOx distribution. Data shown as "adsorbed $SO_3$ amount" in FIG. 4 is collected by the following method. More specifically, the DOC 22a is caused to adsorb a sufficient amount of SOx in a bed temperature shown as a "present temperature" in FIG. 4, first. Subsequently, amounts of $SO_3$ desorbed from the DOC 22a in the respective bed temperatures in increase of the bed temperature of the DOC 22a are measured under a condition with an increasing speed set as constant. Subsequently, a graph is created by relating the desorbed $SO_3$ amounts with the bed temperatures of the DOC 22a. Thereby, the distribution expressing the desorbed $SO_3$ amount (hereinafter, also referred to as a "desorbed $SO_3$ distribution") can be obtained. By a similar method to this, a graph (hereinafter, also referred to as a "desorbed $SO_2$ distribution") in which the amounts of $SO_2$ desorbed from the DOC 22a in the respective bed temperatures in increase of the bed temperature of the DOC 22a is related with the bed temperature of the DOC 22a can be also obtained. The $SO_3$ which is desorbed from the DOC 22a may be directly measured by a sensor, or may be calculated from a difference of SOx and $SO_2$ by measuring both SOx and $SO_2$ by using sensors for detecting SOx and $SO_2$ ($SO_3 = SOx - SO_2$).

Here, $SO_3$ which is desorbed from the DOC 22a during increase of the bed temperature of the DOC 22a is actually $SO_3$ which is adsorbed to the DOC 22a at the bed temperature shown as the "present temperature" in FIG. 4. However, $SO_3$ which is desorbed from the DOC 22a at a certain bed temperature is $SO_3$ that can continue to adsorb to the DOC 22a until the bed temperature reaches the certain bed temperature, and to describe more, can be also considered as $SO_3$ that can adsorb to the DOC 22a at the certain bed temperature. If a vertical axis of the aforementioned desorbed $SO_3$ distribution is replaced with amounts of $SO_3$ which adsorbs to the DOC 22a at the respective bed temperatures in increase of the bed temperature of the DOC 22a, on the basis of an assumption as above, the graph of the data of the "adsorbed $SO_3$ amount" shown in FIG. 4, that is, the adsorbed $SO_3$ distribution can be obtained. By a method similar to this, an adsorbed $SO_2$ distribution can be also obtained.

Further, data shown as a "saturation $SO_3$ amount" in FIG. 4 is collected by a method similar to the data of the "adsorbed $SO_3$ amount". The data of the "saturation $SO_3$ amount" specifically corresponds to an amount of $SO_3$ which is desorbed from the DOC 22a in each of the bed temperatures (intervals of 5° C., for example) under increase of the bed temperature of the DOC 22a under a condition that an increase speed is set as an extremely low speed. Since the increase speed of the bed temperature of the DOC 22a is an extremely low speed, the data of the "saturation $SO_3$ amount" can be considered as a maximum value of the amount of $SO_3$ which is desorbed from the DOC 22a. Further, the aforementioned assumption can be applied to the maximum value. That is, a maximum amount of $SO_3$ that is desorbed from the DOC 22a at a certain bed temperature can be considered as equal to a maximum amount of $SO_3$ that can adsorb to the DOC 22a at the certain bed temperature. If a vertical axis of the aforementioned desorbed $SO_3$ distribution is replaced with the maximum amount of the $SO_3$ described above on the basis of an assumption like this, the graph of the data of the "saturation $SO_3$ amount" shown in FIG. 4, that is, the saturation $SO_3$ distribution can be obtained. By a method similar to this, a saturation $SO_2$ distribution can be also obtained.

The estimating section M2 estimates the SOx saturation factor $(T_2(t), t)$ in the $t^{th}$ cycle by formula (3) as follows having a present bed temperature $T_2$ of the DOC 22a in the $t^{th}$ cycle as a variable. As the present bed temperature $T_2$ which is a representative value of the present bed temperature of the DOC 22a, a detection value of the temperature sensor 34 can be used, for example.

SOx saturation factor$(T_2(t),t)$=1−(total adsorption allowance amount$(T_2(t),t)$/total saturation amount$(T_2(t),t)$)  (3)

A calculation process of the SOx saturation factor $(T_2(t), t)$ in formula (3) is as follows. First, by formulae (4) and (5) as follows having a bed temperature $T_1$ under increase of the bed temperature of the DOC 22a and the present bed temperature $T_2$ as variables, a saturation $SO_2$ distribution $(T_1, T_2(t), t)$ and a saturation $SO_3$ distribution $(T_1, T_2(t), t)$ in the $t^{th}$ cycle are respectively calculated.

Saturation $SO_2$ distribution$(T_1,T_2(t),t)$ [µg/° C.]=reference saturation $SO_2$ distribution×bed temperature correction $SO_2$ map$(T_2(t))$ [µg/° C.]  (4)

Saturation $SO_3$ distribution$(T_1,T_2(t),t)$ [µg/° C.]=reference saturation $SO_3$ distribution×bed temperature correction $SO_3$ map$(T_2(t))$ [µg/° C.]  (5)

The reference saturation $SO_2$ distribution in formula (4) is a saturation $SO_2$ distribution which is created by setting the bed temperature (the "present temperatures" in FIG. 4) at the time of causing a sufficient amount of SOx to adsorb to the DOC 22a as a reference bed temperature (a bed temperature in a vicinity of 300° C. at which the aforementioned adsorption limit amount becomes maximum, for example). The same also applies to the reference saturation $SO_3$ distribution in formula (5). The bed temperature correction $SO_2$ map $(T_2(t))$ in formula (4) is a map which sets a correction value for converting the reference saturation $SO_3$ distribution into the saturation $SO_2$ distribution at a present bed temperature $T_2$. The bed temperature correction $SO_3$ map $(T_2(t))$ in formula (5) is similar to this. The reference saturation SOx distribution and the correction map like them can be stored in the ROM of the ECU 30, for example, and can be properly read in accordance with the present bed temperature $T_2$.

Figure 5:
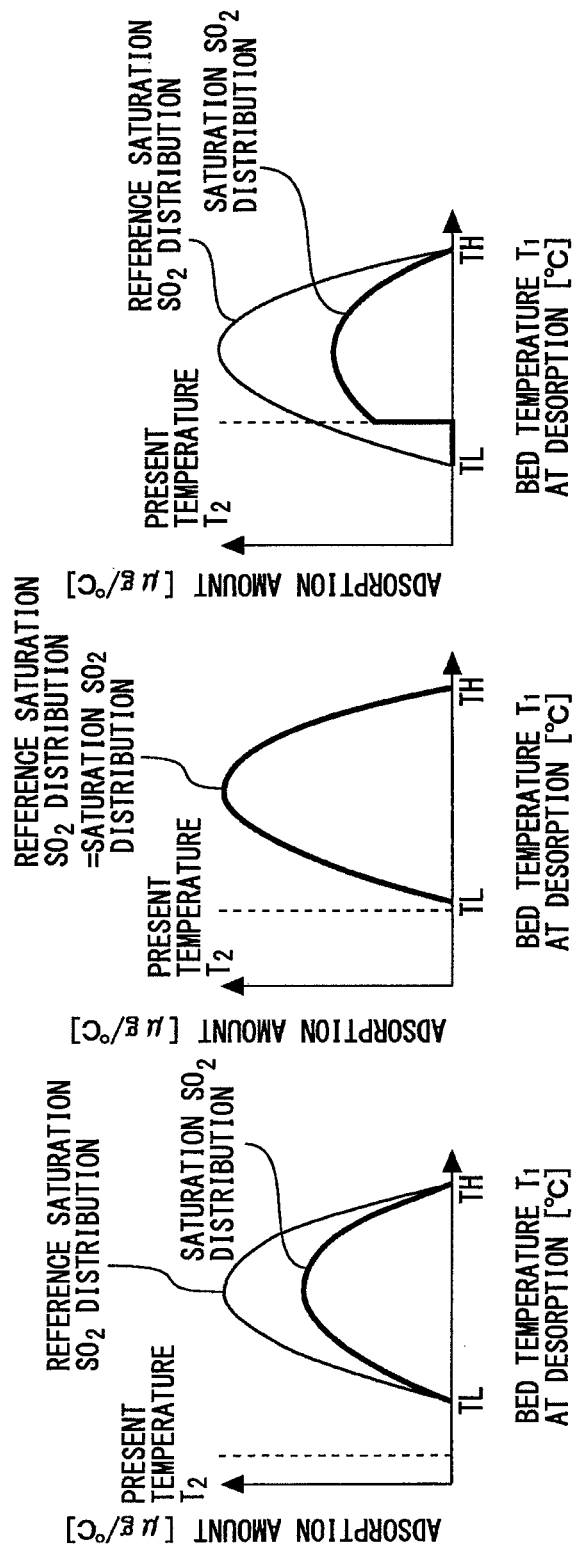
FIG. 5 is a diagram for describing a relation between a reference saturation SOx distribution and a saturation SOx distribution after correction.

A relation between the reference saturation SOx distribution and the saturation SOx distribution after correction will be described with reference to FIG. 5 with $SO_2$ as an example. FIG. 5 is a diagram for describing a relation between a reference saturation SOx distribution and a saturation SOx distribution after correction. Note that TL and TH in a horizontal axis in FIG. 6 respectively correspond to a temperature (a lower limit temperature) at which $SO_2$ starts to desorb from the DOC 22a during increase of the bed temperature of the DOC 22a, and a temperature (an upper limit temperature) at which $SO_2$ finishes desorbing from the DOC 22a. Difference among three kinds of distributions shown in FIG. 6 lies in the present bed temperature $T_2$. That is, in a case where the present bed temperature $T_2$ is equal to the reference temperature, a shape of the saturation $SO_2$ distribution after correction corresponds to a shape of the reference saturation $SO_2$ distribution (center). In a case where the present bed temperature $T_2$ is lower than the reference temperature (a left side), and in a case where the present bed temperature $T_2$ is higher than the reference temperature (a right side), the shapes of the saturation $SO_2$ distributions after correction do not correspond to the shape of the reference saturation $SO_2$ distribution. In the case where the present bed temperature $T_2$ is higher than the reference temperature (the right side), the shape of the saturation $SO_2$ distribution after correction is in such a shape that data at lower temperatures than the present bed temperature $T_2$ are omitted. The reason is that it is conceivable that at the lower temperatures than the present bed temperature $T_2$, SOx that could have originally continued to adsorb to the DOC 22a in the bed temperature range already desorbs from the DOC 22a.

Subsequently, the saturation $SO_2$ distribution $(T_1, T_2(t), t)$ which is calculated by formula (4) is substituted into formula (6) as follows, and a total saturation $SO_2$ amount $(T_2(t), t)$ in the $t^{th}$ cycle is calculated. Further, the saturation $SO_3$ distribution $(T_1, T_2(t), t)$ which is calculated by formula (5) is substituted into formula (7) as follows, and the total saturation $SO_3$ amount in the $t^{th}$ cycle is calculated.

Total saturation $SO_2$ amount$(T_2(t),t)$ [µg]=$\int_{TL}^{TH}$Saturation $SO_2$ distribution$(T_1,T_2(t),t)$ [µg/° C.]$dT_1$  (6)

Total saturation $SO_3$ amount$(T_2(t),t)$ [µg]=$\int_{TL}^{TH}$Saturation $SO_3$ distribution$(T_1,T_2(t),t)$ [µg/° C.]$dT_1$  (7)

After the total saturation $SO_2$ amount $(T_2(t), t)$ and the total saturation $SO_3$ amount $(T_2(t), t)$ are calculated, these amounts are substituted into formula (8) as follows, and a total saturation amount $(T_2(t), t)$ in the $t^{th}$ cycle is calculated.

Total saturation amount$(T_2(t),t)$=Total saturation $SO_2$ amount$(T_2(t),t)$+Total saturation $SO_3$ amount$(T_2(t),t)$  (8)

In the following explanation, the total saturation $SO_2$ amount $(T_2(t), t)$ will be also simply referred to as a total saturation $SO_2$ amount (t). Further, the total saturation $SO_3$ amount $(T_2(t), t)$ will be also simply referred to as a total saturation $SO_3$ amount (t). Further, the total saturation amount $(T_2(t), t)$ will be also simply referred to as a total saturation amount (t).

After the total saturation amount (t) is calculated by formula (8), the saturation $SO_2$ distribution $(T_1, T_2(t), t)$, and a final adsorbed $SO_2$ distribution $(T_1, t)$ in the $t^{th}$ cycle which is estimated in the estimating section M6 are substituted into formula (9) as follows, and an adsorption allowance $SO_2$ distribution $(T_1, T_2(t), t)$ in the $t^{th}$ cycle is calculated. Further, the saturation $SO_3$ distribution $(T_1, T_2(t), t)$ and a final adsorbed $SO_3$ distribution $(T_1, t)$ in the $t^{th}$ cycle which is estimated in the estimating section M6 are substituted into formula (10) as follows, and adsorption allowance $SO_3$ distribution $(T_1, T_2(t), t)$ in the $t^{th}$ cycle is calculated.

$$\text{Adsorption allowance } SO_2 \text{ distribution}(T_1,T_2(t),t) \\ [\mu g/°C.]=\max\{\text{saturation } SO_2 \text{ distribution}(T_1,T_2(t),t) [\mu g/°C.]-\text{final adsorbed } SO_2 \text{ distribution}(T_1,t) [\mu g/°C.],0\} \quad (9)$$

$$\text{Adsorption allowance } SO_3 \text{ distribution}(T_1,T_2(t),t) \\ [\mu g/°C.]=\max\{\text{saturation } SO_3 \text{ distribution}(T_1,T_2(t),t) [\mu g/°C.]-\text{final adsorbed } SO_3 \text{ distribution}(T_1,t) [\mu g/°C.],0\} \quad (10)$$

Subsequently, the adsorption allowance $SO_2$ distribution $(T_1, T_2(t), t)$ which is calculated by formula (9) is substituted into formula (11) as follows, and a total adsorption allowance $SO_2$ amount $(T_2(t), t)$ in the $t^{th}$ cycle is calculated. Further, the adsorption allowance $SO_3$ distribution $(T_1, T_2(t), t)$ which is calculated by formula (10) is substituted into formula (12) as follows, and a total adsorption allowance $SO_3$ amount $(T_2(t), t)$ in the $t^{th}$ cycle is calculated.

$$\text{Total adsorption allowance } SO_2 \text{ amount}(T_2(t),t) \\ [\mu g]=\int_{TL}^{TH}\text{adsorption allowance } SO_2 \text{ distribution}(T_1,T_2(t),t) [\mu g/°C.]dT_1 \quad (11)$$

$$\text{Total adsorption allowance } SO_3 \text{ amount}(T_2(t),t) \\ [\mu g]=\int_{TL}^{TH}\text{adsorption allowance } SO_3 \text{ distribution}(T_1,T_2(t),t) [\mu g/°C.]dT_1 \quad (12)$$

In the following explanation, the adsorption allowance $SO_2$ distribution $(T_1, T_2(t), t)$ will be also simply referred to as the adsorption allowance $SO_2$ distribution (t). Further, the adsorption allowance $SO_3$ distribution $(T_1, T_2(t), t)$ will be also simply referred to as the adsorption allowance $SO_3$ distribution (t). Further, the total adsorption allowance $SO_2$ amount $(T_2(t), t)$ will be also simply referred to as the total adsorption allowance $SO_2$ amount (t). Further, the total adsorption allowance $SO_3$ amount $(T_2(t), t)$ will be also simply referred to as the total adsorption allowance $SO_3$ amount (t).

Figure 6:
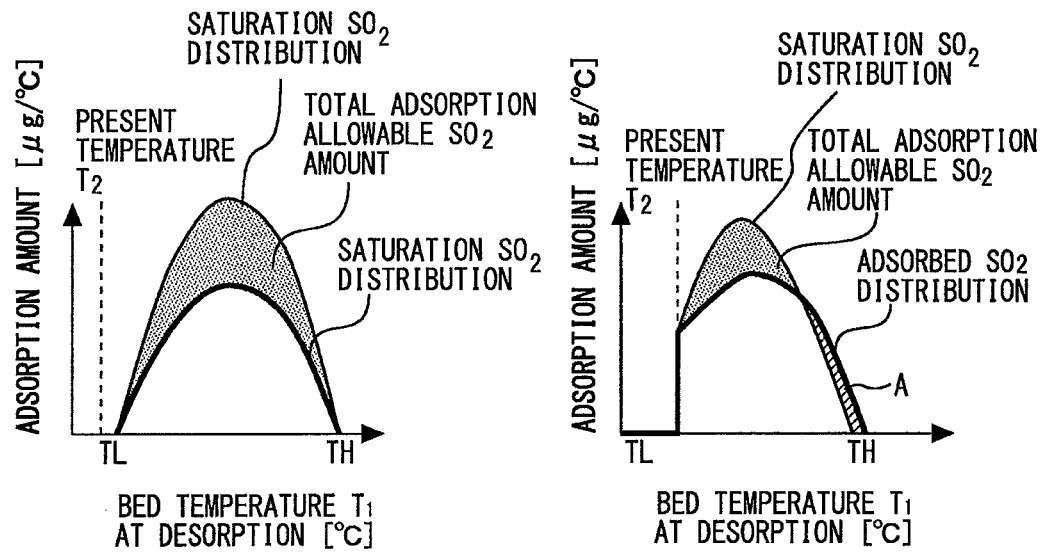
FIG. 6 is a diagram for describing a total adsorption allowance $SO_2$ amount.
Figure 7:
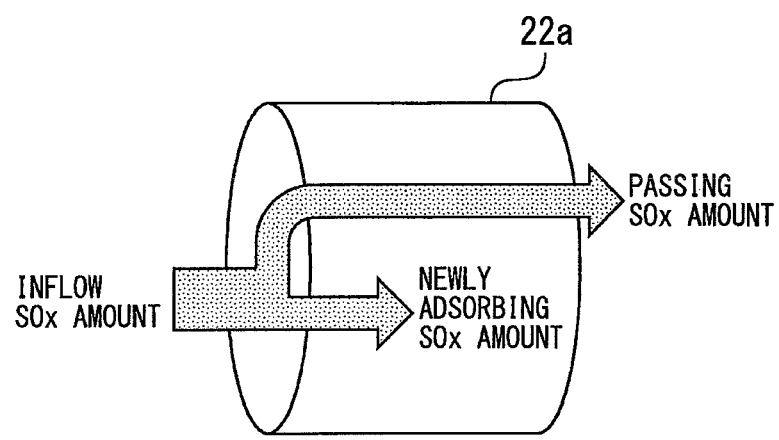
FIG. 7 is a view for describing a relation between a newly adsorbing SOx amount and a passing SOx amount.

With reference to FIG. 6, the total adsorption allowance $SO_2$ amount (t) will be described. The same applies to the total adsorption allowance $SO_3$ amount (t). As shown in FIG. 7, the total adsorption allowance $SO_2$ amount (t) can be expressed as an area obtained by excluding an overlapping portion of the saturation $SO_2$ distribution and the adsorbed $SO_2$ distribution from the saturation $SO_2$ distribution. As shown as a region A in a distribution at a right side of FIG. 7, in a case where an amount of $SO_2$ adsorbing to the DOC 22a in each of the bed temperatures under increase of the bed temperature of the DOC 22a, that is, the adsorbed $SO_2$ amount exceeds a maximum amount thereof, that is, the saturation $SO_2$ amount, the adsorbed $SO_2$ amount is excluded from calculation of the total adsorption allowance $SO_2$ amount (t), because the DOC 22a is considered to be saturated. Further, the reason why in the distribution at the right side, data at lower temperatures than the present bed temperature $T_2$ are omitted is as described in FIG. 5.

After the total adsorption allowance $SO_2$ amount (t) and the total adsorption allowance $SO_3$ amount (t) are calculated, these amounts are substituted into formula (13) as follows, and a total adsorption allowance amount $(T_2(t), t)$ in the $t^{th}$ cycle is calculated.

$$\text{Total adsorption allowance amount}(T_2(t),t)=\text{Total adsorption allowance } SO_2 \text{ amount}(T_2(t),t)+\text{Total adsorption allowance } SO_3 \text{ amount}(T_2(t),t) \quad (13)$$

Further, if the total saturation amount (t) which is calculated by formula (8), and the total adsorption allowance amount (t) which is calculated by formula (13) are substituted into formula (3), the saturation factor $(T_2(t), t)$ can be calculated. In the following explanation, the saturation factor $(T_2(t), t)$ will be also simply referred to as the saturation factor (t).

Returning to FIG. 3, explanation of the calculation logic of the target bed temperature Ttrg will be continued. The estimating section M3 estimates an amount of SOx (hereinafter, also referred to as "a newly adsorbing SOx amount") that is "SOx flowing into the DOC 22a" and newly adsorbs to the DOC 22a, and an amount of SOx (hereinafter, also referred to as "a passing SOx amount") that is "SOx flowing into the DOC 22a" and passes through the DOC 22a without adsorbing to the DOC 22a. First of all, a relation between the newly adsorbing SOx amount and the passing SOx amount will be described with reference to FIG. 7. FIG. 7 is a view for describing a relation between a newly adsorbing SOx amount and a passing SOx amount. As shown by arrows in FIG. 7, a sum of the newly adsorbing SOx amount and the passing SOx amount is equal to the inflow SOx amount. The reason is that a part of "SOx flowing into the DOC 22a" adsorbs to the DOC 22a, and the remainder passes through the DOC 22a without adsorbing to the DOC 22a.

The estimating section M3 estimates the newly adsorbing SOx amount by formula (14) as follows having the inflow SOx amount (t) which is estimated in the estimating section M1 and the saturation rate (t) which is estimated in the estimating section M2 as variables, and estimates the passing SOx amount by formula (15) as follows.

$$\text{Newly adsorbing SOx amount (inflow SOx amount}(t),\text{saturation factor}(t)) [\mu g/s]=\text{inflow SOx amount}(t)\times\text{adsorption rate map(saturation factor}(t)) \quad (14)$$

$$\text{Passing SOx amount(inflow SOx amount}(t),\text{saturation factor}(t)) [\mu g/s]=\text{inflow SOx amount}(t)\times\{1-\text{adsorption rate map(saturation factor}(t))\} \quad (15)$$

In the following explanation, the newly adsorbing SOx amount (inflow SOx amount (t), saturation factor (t)) will be also simply referred to as the newly adsorbing SOx amount (t). Further, the passing SOx amount (inflow SOx amount (t), saturation factor (t)) will be also simply referred to as the passing SOx amount (t).

Figure 8:
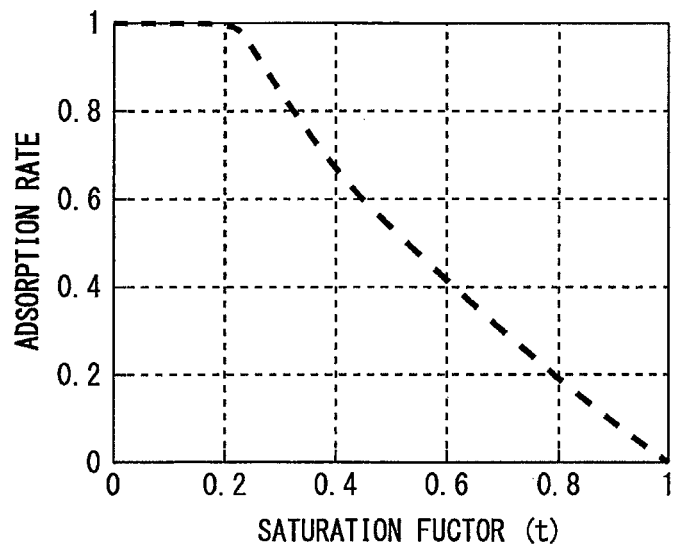
FIG. 8 is a diagram for describing an adsorption rate map.

The adsorption rate map in formulae (14) and (15) is a map which is created on the basis of a characteristic that a ratio (that is, an adsorption rate) of SOx adsorbing to the DOC 22a of "SOx flowing into the DOC 22a" in the $t^{th}$ cycle varies in accordance with the saturation factor (t). FIG. 8 is a diagram for describing an adsorption rate map. The characteristic of the adsorption rate map is such that the adsorption rate is high in a region where the saturation factor (t) is low, and as the saturation factor (t) becomes higher, the adsorption rate gradually reduces, as shown in FIG. 8. The map like this can be stored in the ROM of the ECU 30, for example, and can be properly read in accordance with the present bed temperature $T_2$.

Figure 9:
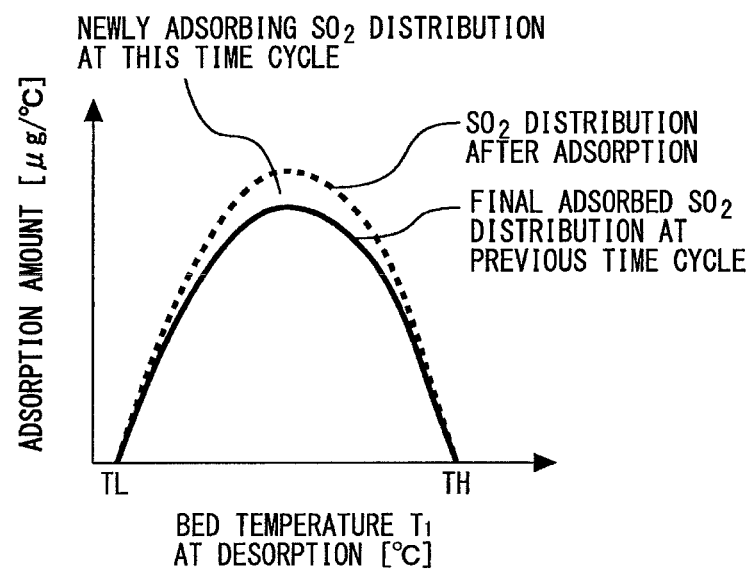
FIG. 9 is a diagram for describing an SOx distribution after adsorption.

Returning to FIG. 3, the estimating section M4 estimates a SOx distribution after adsorption by reflecting the newly adsorbing SOx amount estimated in the estimating section M3 in the adsorption SOx distribution. The SOx distribution after adsorption will be described with reference to FIG. 9 with $SO_2$ as an example. FIG. 9 is a diagram for describing an SOx distribution after adsorption. As shown in FIG. 9, the SO₂ distribution after adsorption is estimated by adding a distribution (hereinafter, also referred to as "a newly adsorbing SO₂ distribution") expressing an amount of SO₂ that newly adsorbs to the DOC 22a in a cycle of this time (for example, the $t^{th}$ cycle) to a final adsorbed SO₂ distribution in a cycle of a previous time (for example, a $t-1^{th}$ cycle).

The estimating section M4 specifically calculates the newly adsorbing SO₂ distribution in the $t^{th}$ cycle by formula (16) as follows having the newly adsorbing SOx amount (t), the total adsorption allowance amount (t) and the adsorption allowance SO₂ distribution (t) as variables. Similarly to the newly adsorbing SO₂ distribution, the estimating section M4 calculates a distribution (hereinafter, also referred tows a "newly adsorbing SO₃ distribution") expressing an amount of SO₃ which newly adsorbs to the DOC 22a from formula (17) as follows. For the adsorption allowance SO₂ distribution (t) and the total adsorption allowance amount (t), the values calculated in the estimating section M2 are used.

Newly adsorbing SO₂ distribution(newly adsorbing SOx amount(t),adsorption allowance SO₂ distribution(t),total adsorption allowance amount(t)) [μg/° C.]=adsorption allowance SO₂ distribution (t) [μg/° C.]×{newly adsorbed SOx amount(t)/total adsorption allowance amount(t)}   (16)

Newly adsorbing SO₃ distribution(newly adsorbing SOx amount(t),adsorption allowance SO₃ distribution(t),total adsorption allowance amount(t)) [μg/° C.]=adsorption allowance SO₃ distribution (t) [μg/° C.]×{newly adsorbed SOx amount(t)/total adsorption allowance amount(t)}   (17)

In the following explanation, the newly adsorbing SO₂ distribution (newly adsorbing SOx amount (t), adsorption allowance SO₂ distribution (t), total adsorption allowance amount (t)) will be also simply referred to as the newly adsorbing SO₂ distribution (t). Further, the newly adsorbing SO₃ distribution (newly adsorbing SOx amount (t), adsorption allowance SO₃ distribution (t), total adsorption allowance amount (t)) will be also simply referred to as the newly adsorbing SO₃ distribution (t).

Subsequently, the estimating section M4 substitutes the calculated newly adsorbing SO₂ distribution, and the final adsorbed SO₂ distribution (t−1) in the $t-1^{th}$ cycle into formula (18) as follows, and calculates the SO₂ distribution after adsorption. Further, the estimating section M4 substitutes the calculated newly adsorbing SO₃ distribution, and the adsorbed SO₃ distribution (t−1) estimated in the estimating section M6 in the $t-1^{th}$ cycle into formula (19) as follows, and calculates the SO₃ distribution after adsorption.

SO₂ distribution after adsorption(t) [μg/° C.]=final adsorbed SO₂ distribution(t−1) [μg/° C.]+newly adsorbing SO₂ distribution(t) [μg/° C.]   (18)

SO₃ distribution after adsorption(t) [μg/° C.]=final adsorbed SO₃ distribution(t−1) [μg/° C.]+newly adsorbing SO₃ distribution(t) [μg/° C.]   (19)

Returning to FIG. 3, the estimating section M5 estimates an amount of SOx (hereinafter, also referred to as a "newly desorbing SOx amount") which newly desorbs from the DOC 22a, on the basis of the SOx distribution after adsorption which is estimated in the estimating section M4.

Figure 10:
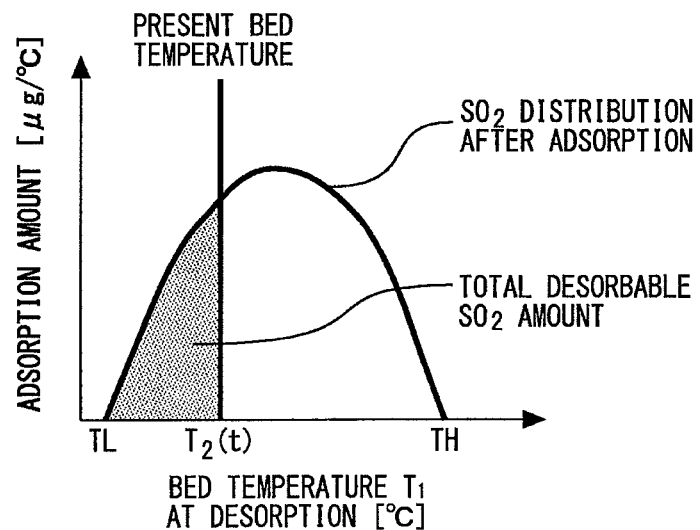
FIG. 10 is a diagram for describing a total desorbable SOx amount.

First of all, the estimating section M5 specifically estimates a total amount of SOx (hereinafter, also referred to as a "total desorbable SOx amount") that can desorb from the DOC 22a. The total desorbable SOx amount will be described with reference to FIG. 10 with SO₂ as an example. FIG. 10 is a diagram for describing a total desorbable SOx amount. Note that TL and TH in a horizontal axis in FIG. 10 respectively correspond to the lower limit temperature and the upper limit temperature described above. As shown in FIG. 10, the total desorbable SOx amount corresponds to an area of the SOx distribution after adsorption at a side of lower temperatures than the present bed temperature $T_2$ and at a side of higher temperatures than the lower limit temperature TL.

A total amount of SO₂ that can desorb from the DOC 22a, that is, the total desorbable SO₂ amount is calculated from formula (20) as follows having the present bed temperature $T_2$ as a variable. A total amount of SO₃ that can desorb from the DOC 22a, that is, a total desorbable SO₃ amount is calculated by formula (21) as follows having the present bed temperature $T_2$ as a variable.

$$\text{Total desorbable SO}_2 \text{ amount } (T_2(t), t) \ [\mu g] = \begin{cases} 0 & (T_2(t) < TL) \\ \int_{T_1}^{T_2(t)} \text{SO}_2 \text{ distribution after adsorption } (t) \, dT_1 & (T_2(t) \geq TL) \end{cases} \quad (20)$$

$$\text{Total desorbable SO}_3 \text{ amount } (T_2(t), t) \ [\mu g] = \begin{cases} 0 & (T_2(t) < TL) \\ \int_{T_1}^{T_2(t)} \text{SO}_3 \text{ distribution after adsorption } (t) \, dT_1 & (T_2(t) \geq TL) \end{cases} \quad (21)$$

The estimating section M5 substitutes the calculated total desorbable SO₂ amount into formula (22) as follows, and calculates an amount of SO₂ that newly desorbs from the DOC 22a in the $t^{th}$ cycle, that is, a newly desorbing SO₂ amount. Further, the estimating section M5 substitutes the calculated total desorbable SO₃ amount into formula (23) as follows, and calculates an amount of SO₃ that newly desorbs from the DOC 22a in the $t^{th}$ cycle, that is, a newly desorbing SO₃ amount. For desorption rates in formulae (22) and (23), set values are used, and can be stored in the ROM of the ECU 30, for example.

Newly desorbing SO₂ amount($T_2(t),t$) [μg]=total desorbable SO₂ amount [μg]×desorption rate   (22)

Newly desorbing SO₃ amount($T_2(t),t$) [μg]=total desorbable SO₃ amount [μg]×desorption rate   (23)

Returning to FIG. 3, the estimating section M6 reflects the newly desorbing SOx amount which is estimated in the estimating section M5 in the SOx distribution after adsorption, and estimates a final adsorbed SOx distribution.

Figure 11:
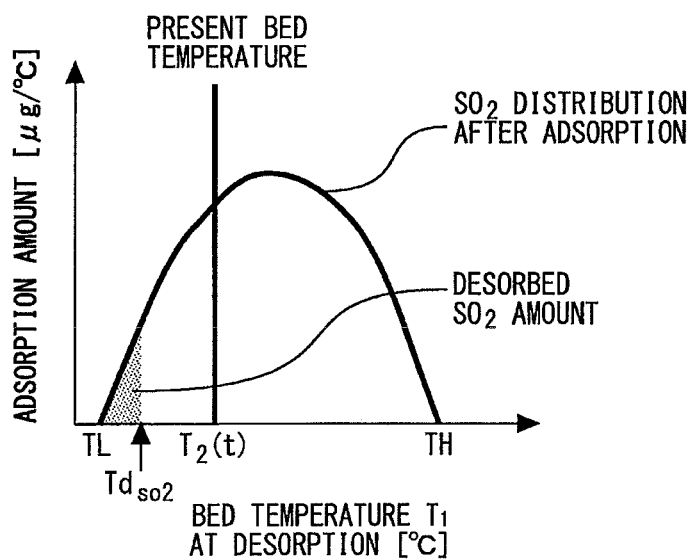
FIG. 11 is a diagram for describing a relation between a final desorbed SOx distribution and the SOx distribution after adsorption.

The estimating section M6 specifically assumes that SOx desorbs by the amount corresponding to the newly desorbing SOx amount estimated in the estimating section M5, and a shape of the SOx distribution after adsorption changes, and estimates the final adsorbed SOx distribution (a SOx distribution after desorption). A relation between the final adsorbed SOx distribution and the SOx distribution after adsorption will be described with reference to FIG. 11 with SO₂ as an example. FIG. 11 is a diagram for describing a relation between a final desorbed SOx distribution and the SOx distribution after adsorption. Note that TL and TH in a horizontal axis of FIG. 11 respectively correspond to the lower limit temperature and the upper limit temperature described above. As shown in FIG. 11, a distribution which remains after an area of the SO₂ distribution after adsorption at the time of an integral value of the SO₂ distribution after adsorption from the lower limit temperature TL corresponding to the newly desorbing SO₂ amount, that is, an area from the lower limit temperature TL to a temperature $Tdso_2$ is removed from the SOx distribution after adsorption becomes the final adsorbed $SO_2$ distribution.

In a case where the temperature $Tdso_2$ in FIG. 11 exceeds the bed temperature $T_1$, the case means that $SO_2$ is totally desorbed from the DOC 22a. Considering this, the final adsorbed $SO_2$ distribution in the $t^{th}$ cycle is expressed by formula (24) as follows having the bed temperature $T_1$ as a variable, and the final adsorbed $SO_3$ distribution in the $t^{th}$ cycle is expressed by formula (25) as follows. A temperature $Tdso_3$ in formula (25) corresponds to a floor temperature $T_1$ at a time of an integral value from the lower limit temperature TL, of the $SO_3$ distribution after adsorption corresponding to the newly desorbing $SO_3$ amount.

$$\text{Final absorbed } SO_2 \text{ distribution } (T_1, t) \ [\mu g] = \begin{cases} 0 & (T_1(t) < Td_{SO2}) \\ SO_2 \text{ distribution after adsorption} & (T_1(t) \geq Td_{SO2}) \end{cases} \quad (24)$$

$$\text{Final absorbed } SO_3 \text{ distribution } (T_1, t) \ [\mu g] = \begin{cases} 0 & (T_1(t) < Td_{SO3}) \\ SO_3 \text{ distribution after adsorption} & (T_1(t) \geq Td_{SO3}) \end{cases} \quad (25)$$

A relation between the newly desorbing $SO_2$ amount and the temperature $Tdso_2$ can be expressed by formula (26) as follows, and a relation between the newly desorbing $SO_3$ amount and the temperature $Tdso_3$ can be expressed by formula (27) as follows.

$$\int_{TL}^{Tdso2} SO_2 \text{ distribution after adsorption}(T_1,t) \ [\mu g/^\circ C.] dT_1 = \text{Newly desorbing } SO_2 \text{ amount}(t) \ [\mu g] \quad (26)$$

$$\int_{TL}^{Tdso3} SO_3 \text{ distribution after adsorption}(T_1,t) \ [\mu g/^\circ C.] dT_1 = \text{Newly desorbing } SO_3 \text{ amount}(t) \ [\mu g] \quad (27)$$

Returning to FIG. 3, the estimating section M7 estimates an amount of SOx (hereinafter, also referred to as a "passing $SO_3$ amount") to be converted to $SO_3$ in the aforementioned passing SOx.

As described in FIG. 2, in the DOC 22a, a part of $SO_2$ that is adsorbed to the precious metal 22d is converted into $SO_3$. Assuming that the conversion also occurs to $SO_2$ in the passing SOx, the rate at which passing SOx converts to $SO_3$ depends on the present bed temperature $T_2$ and the exhaust flow rate (gas flow rate) GA of engine 10. The estimating section M7 estimates the passing $SO_3$ amount in the $t^{th}$ cycle by formula (28) as follows having a passing amount, the present bed temperature $T_2$, and gas flow rate GA as variables. An amount of $SO_2$ (hereinafter, also referred to as a "passing $SO_2$ amount") that is not converted to $SO_3$ in the passing SOx can be expressed by formula (29) as follows.

Passing $SO_3$ amount(passing amount$(t),T_2(t)$)
  [μg/s]=Passing SOx amount$(t)$ [μg]×$SO_3$ conversion rate map$(T_2(t))$×$SO_3$ conversion rate correction map$(GA(t))$  (28)

Passing $SO_2$ amount(passing amount$(t),T_2(t)$)
  [μg/s]=Passing SOx amount$(t)$ [μg]×{1−$SO_3$ conversion rate map$(T_2(t))$}×{1−$SO_3$ conversion rate correction map$(GA(t))$}  (29)

Figure 12:
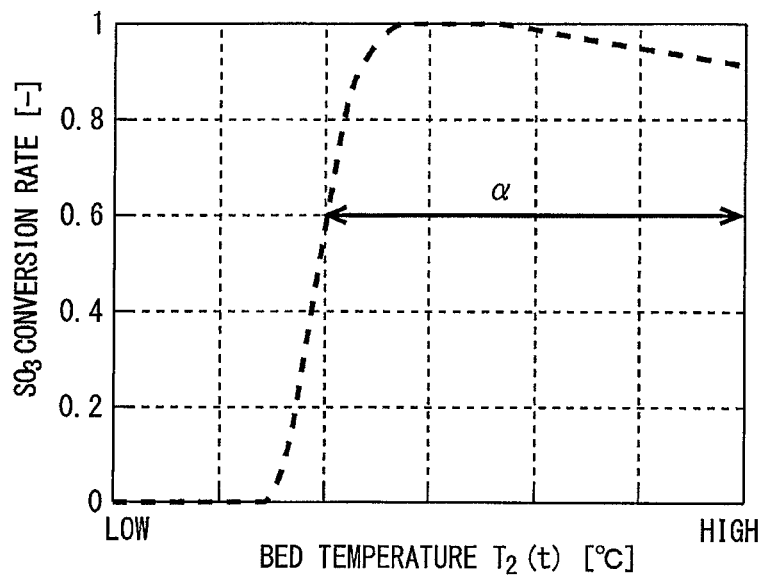
FIG. 12 is a diagram for describing an $SO_3$ conversion rate map.

The $SO_3$ conversion rate map $(T_2(t))$ in formulae (28) and (29) is a map which is created on the basis of a characteristic that a ratio (that is, the $SO_3$ conversion rate) of SOx discharged in the state of $SO_3$ from the DOC 22a of the "SOx flowing into the DOC 22a" in the $t^{th}$ cycle varies in accordance with the present bed temperature $T_2$ of the DOC 22a. FIG. 12 is a diagram for describing an $SO_3$ conversion rate map. For example, the characteristic of the $SO_3$ conversion rate map is such that as shown in FIG. 12, when the present bed temperature $T_2$ is in a certain temperature range α, the $SO_3$ conversion rate is high, and at a side of lower temperatures than the temperature range α, conversion to $SO_3$ from $SO_2$ hardly occurs. The map like this can be stored in the ROM of the ECU 30, for example, and can be properly read in accordance with the present bed temperature $T_2$.

Figure 13:
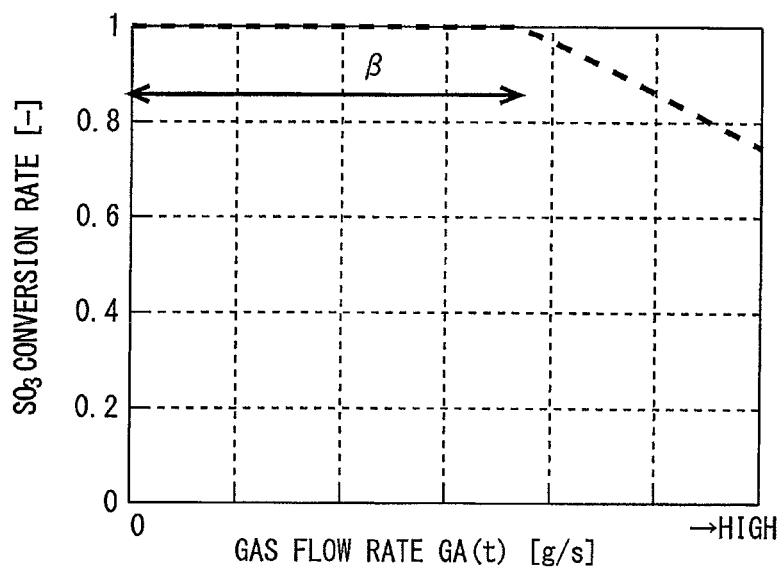
FIG. 13 is a diagram for describing an $SO_3$ conversion rate correction map.

The $SO_3$ conversion rate correction map $(GA(t))$ in formulae (28) and (29) is a map which is created on the basis of a characteristic that a conversion rate of $SO_3$ in the $t^{th}$ cycle varies in accordance with a gas flow rate GA. FIG. 13 is a diagram for describing an $SO_3$ conversion rate correction map. For example, the characteristic of the $SO_3$ conversion rate correction map is such that as shown in FIG. 13, when the gas flow rate GA is in a certain gas flow rate range β, the $SO_3$ conversion rate is high, and at a side of higher flow rates than the gas flow rate range β, the higher the gas flow rate GA becomes, the harder conversion to $SO_3$ from $SO_2$ hardly occurs. The map like this can be stored in the ROM of the ECU 30, for example, and can be properly read in accordance with the gas flow rate GA. As the gas flow rate GA, a detection value of the airflow meter 32 can be used, for example.

Returning to FIG. 3, the estimating section M8 estimates a ratio of reduction of $SO_3$ to $SO_2$ (hereinafter, also referred to as a "$SO_2$ reduction rate") in the DOC 22a among the passing SOx described above.

In the DOC 22a, part of $SO_3$ is converted to $SO_2$ by reduction reaction. The reduction reaction to $SO_2$ is influenced by the reducing atmosphere of the DOC 22a. The estimating section M8 estimates the $SO_2$ reduction rate in the $t^{th}$ cycle by formula (30) as follows having a ratio ΔF/A of the exhaust emission addition amount to the exhaust flow rate (gas flow rate) GA as variable.

$SO_2$ reduction rate(ΔF/A$(t)$) [−]=$SO_2$ reduction rate map(ΔF/A$(t)$)  (30)

Figure 14:
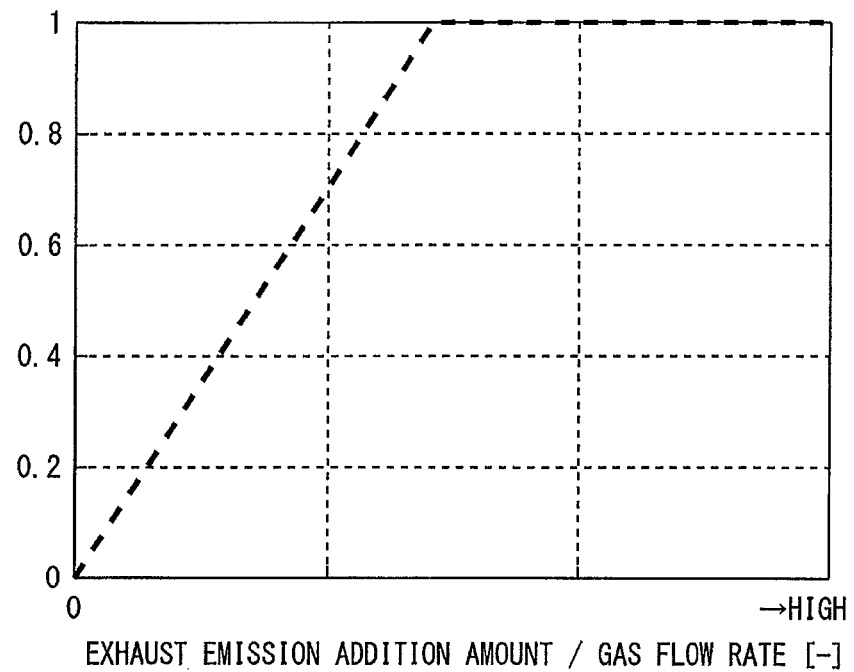
FIG. 14 is a diagram for describing an $SO_2$ reduction rate map.

The $SO_2$ reduction rate map (ΔF/A(t)) in formula (30) is a map which is created on the basis of a characteristic that a $SO_2$ reduction rate in the $t^{th}$ cycle varies in accordance with the ΔF/A indicating the strength of the reducing atmosphere of the DOC 22a. FIG. 14 is a diagram for describing the $SO_2$ reduction rate map. For example, as shown in FIG. 14, the characteristic of the $SO_2$ reduction rate map shows a tendency that as the ΔF/A increases from 0, that is, as the reducing atmosphere becomes stronger, the $SO_2$ reduction rate gradually increases from 0 to 1 and thereafter is maintained in the vicinity of 1. The map like this can be stored in the ROM of the ECU 30, for example, and can be properly read in accordance with the ΔF/A. The ΔF/A in the $t^{th}$ cycle can be calculated by the formula (31) having the passing amount and the gas flow rate GA flowing into the DOC 22a as variables.

ΔF/A(passing amount$(t),GA(t)$)=exhaust emission addition amount$(t)$/1000×light oil specific gravity [g/cm$^3$]/$GA$[g/s]  (31)

Figure 15:
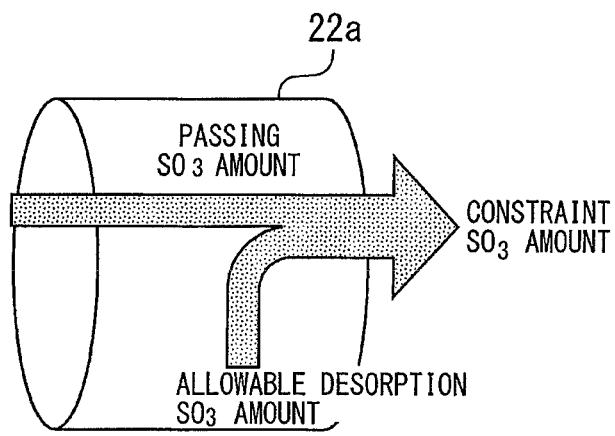
FIG. 15 is a view for describing an allowable desorption $SO_3$ amount.

Returning to FIG. 3, the calculating section M9 calculates an amount of $SO_3$ (hereinafter, also referred to as an "allowable desorption $SO_3$ amount") that may be desorbed from the DOC 22a during increase of the bed temperature of the DOC 22a. The allowable desorption $SO_3$ amount will be described with reference to FIG. 15. FIG. 15 is a view for describing an allowable desorption $SO_3$ amount. A constrained $SO_3$ amount shown in FIG. 15 corresponds to a constraint concerning sulfate white smoke, and in FIG. 14, a sum of the passing $SO_3$ amount and the allowable desorption $SO_3$ amount is equal to the constrained $SO_3$ amount. The sum of the passing $SO_3$ amount and the allowable desorption $SO_3$ amount is an amount of $SO_3$ at a downstream side of the DOC 22a. Therefore, if the sum becomes the constraint $SO_3$ amount, the constrained is satisfied.

However, a part of the sum of the passing $SO_3$ amount and the allowable desorption $SO_3$ amount is reduced to $SO_2$ in the course of flowing through the DOC 22a. Therefore, if allowable desorption $SO_3$ amount satisfies the following formula (32) with constrained $SO_3$ amount, passing $SO_3$ amount, and $SO_2$ reduction rate as variables, the constraint is satisfied.

Allowable desorption $SO_3$ amount(constraint $SO_3$ amount(gas flow rate($t$)),passing $SO_3$ amount($t$), $SO_2$ reduction rate($\Delta F/A(t)$)) [µg/s]=constrained $SO_3$ amount(gas flow rate($t$)) [µg/s]/(1−$SO_2$ reduction rate) [−]−passing $SO_3$ amount($t$) [µg/s]  (32)

In the following explanation, the allowable desorption $SO_3$ amount (constraint $SO_3$ amount (gas flow rate (t)), passing $SO_3$ amount (t), $SO_2$ reduction rate ($\Delta F/A(t)$)) will be also simply referred to as the allowable desorption $SO_3$ amount (t).

Figure 16:
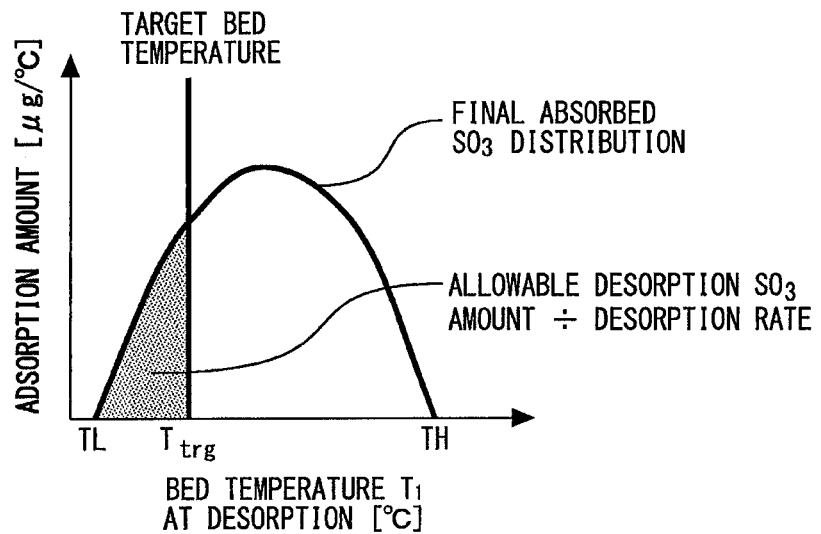
FIG. 16 is a diagram for describing a target bed temperature Ttrg.

Returning to FIG. 3, the calculation section M10 calculates a target bed temperature Ttrg in the $t^{th}$ cycle for restraining generation of sulfate white smoke under PM regeneration control. The target bed temperature Ttrg will be described with reference to FIG. 16. FIG. 16 is a diagram for describing a target bed temperature Ttrg. Note that TL and TH in a horizontal axis in FIG. 16 respectively correspond to the lower limit temperature and the upper limit temperature described above. As shown in FIG. 16, a bed temperature $T_1$ corresponds to the target bed temperature Ttrg. The bed temperature $T_1$ is a temperature at a time in which a value, which is obtained by multiplying an integral value from the low temperature side of the final adsorbed $SO_3$ distribution by a desorption rate, corresponds to the allowable desorption $SO_3$ amount calculated in the calculating section M9.

A relation between the allowable desorption $SO_3$ amount in the $t^{th}$ cycle and the target temperature Ttrg can be expressed by formula (33) as follows. A set value is used as the desorption rate in formula (33), and can be stored in the ROM of the ECU, for example.

$\int_{TL}^{Ttrg}$Final adsorbed $SO_3$ distribution($T_1,t$) [µg/° C.]$dT_1$×desorption rate=allowable desorption $SO_3$ amount($t$) [µg]  (33)

In this way, according to the system of the first embodiment, it is possible to improve the estimation accuracy of the amount of $SO_3$ discharged from the DOC 22a by modeling the reduction reaction of $SO_3$ at the DOC 22a. This makes it possible to raise the target bed temperature Ttrg while satisfying the constrained $SO_3$ amount. As a result, generation of PM can be completed at an early stage while suppressing white smoke, so that deterioration in fuel consumption can be suppressed.

In the aforementioned embodiment, the estimating section M1 corresponds to "inflow SOx amount estimating section" of the present disclosure. The estimating sections M2, M2 and M3 correspond to "passing $SO_3$ amount estimating section" of the present disclosure. The estimating sections M5 and M6 correspond to "final adsorbed SOx distribution estimating section" of the present disclosure. The estimating section M8 corresponds to "$SO_2$ reduction rate estimating section" of the present disclosure. The calculating section M9 corresponds to "allowable desorption $SO_3$ amount calculating section" of the present disclosure. The calculating section M10 corresponds to "target temperature calculating section" of the present disclosure.

Further, in the aforementioned embodiment, the present bed temperature $T_2$ corresponds to "the representative temperature" of the present disclosure.

Incidentally, in the aforementioned embodiment, PM regeneration control is performed by addition of fuel from the fuel adding valve 24. However, the PM regeneration control may be performed by injection of fuel from the injector 12 (more specifically, sub injection (for example, post injection) later than main injection). In this case, the exhaust emission addition amount in formula (1) can be replaced with a sub injection amount from the injector 12.

Further, in the aforementioned embodiment, the target temperature of the bed temperature of the DOC 22a is calculated with the period under PM regeneration control as an example. However, when control of desorbing SOx from the DOC 22a is performed in combination with PM regeneration control, the target temperature of the bed temperature of the DOC 22a may be calculated by the aforementioned method during the desorption control. In this way, the calculation method of the target temperature described above can be applied to control in general that increases the bed temperature of the DOC 22a to the temperature range in which SOx desorbs from the DOC 22a.

Further, in the aforementioned embodiment, the exhaust emission purifying device 22 including the DOC 22a and the DPF 22b is described as an example. However, the function of oxidizing HC and the like in the DOC 22a is given to the DPF 22b, and the DOC 22a may be omitted from the exhaust emission purifying device 22. In this case, an effect similar to the aforementioned embodiment can be obtained by applying the calculation method of the target temperature described above to the DPF 22b which is given the oxidizing function.

Further, although in the aforementioned embodiment, the engine 10 includes the turbocharger 16, the engine 10 does not have to include the turbocharger 16. That is, the calculation method of the target temperature described above can be also applied to the system of a non-turbocharging diesel engine.

Figure 17:
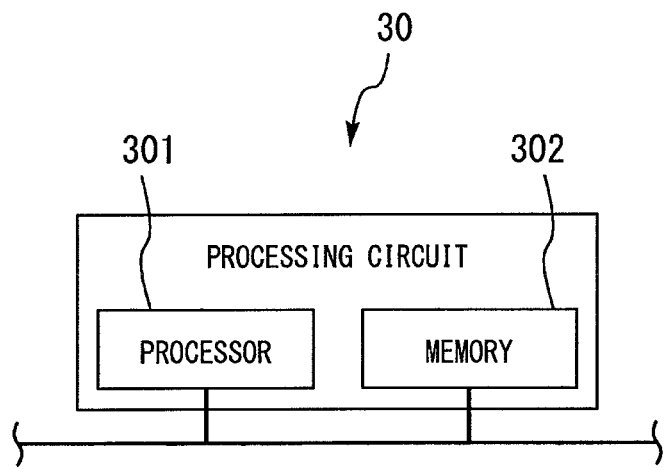
FIG. 17 is a diagram illustrating an example of a hardware configuration of the ECU included in the system of the embodiment.

Furthermore, the ECU 30 that the system of the first embodiment is equipped with may be configured as follows. FIG. 17 is a diagram illustrating an example of a hardware configuration of the ECU included in the system of the embodiment. The respective functions of the ECU 30 may be realized by a processing circuit. According to the example shown in FIG. 17, the processing circuit of the ECU 30 includes at least one processor 301 and at least one memory 302.

In a case where the processing circuit includes at least one processor 301 and at least one memory 302, the respective functions of the ECU 30 may be realized by software, firmware or a combination of software and firmware. At least one of the software and the firmware may be described as a program. At least one of the software and the firmware may be stored in at least one memory. At least one processor 301 may realize the respective functions of the ECU 30 by reading out a program stored in at least one memory 302 and executing the program. At least one processor 301 may be, for example, CPU (Central Processing Unit), processing unit, arithmetic unit, micro processing unit, microcomputer, or DSP (Digital Signal Processor). At least one memory 302 may include a non-volatile or volatile semiconductor memory, for example, RAM (Random Access Memory), EPROM (Erasable Programmable Read Only Memory), EEPROM (Electrically Erasable Programmable Read-Only Memory) or the like, magnetic disk, flexible disk, optical disk or the like.

Figure 18:
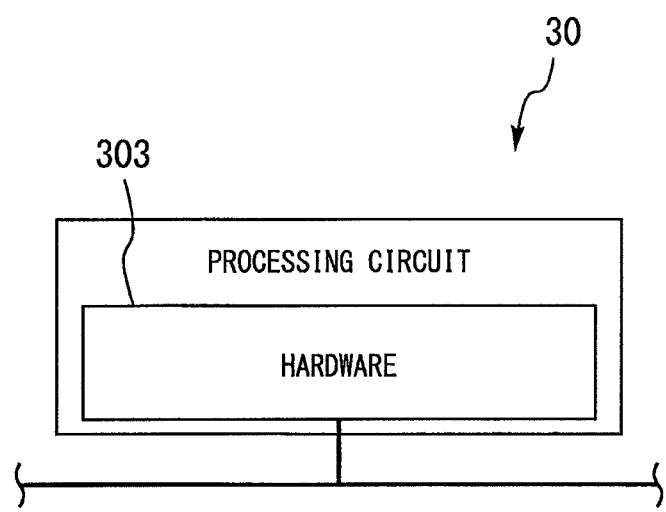
FIG. 18 is a diagram illustrating another example of a hardware configuration of the ECU included in the system of the embodiment.

FIG. 18 is a diagram illustrating another example of a hardware configuration of the ECU included in the system of the embodiment. According to the example shown in FIG. 18, the processing circuit of the ECU 30 includes at least one piece of dedicated hardware 303.

In a case where the processing circuit includes at least one piece of dedicated hardware 303, the processing circuit may be, for example, a single circuit, a composite circuit, a programmed processor, a parallel-programmed processor, an ASIC (Application Specific Integrated Circuit), a FPGA (Field-Programmable Gate Array) or any combination thereof. The functions of each part of the ECU 30 may be realized by respective processing circuits. Further, the functions of each part of the ECU 30 may be realized by collectively by a processing circuit.

With regard to the respective functions of the ECU 30, one part thereof may be realized with dedicated hardware 303, and another part may be realized with software or firmware. The processing circuit may realize the respective functions of the ECU 3.0 by means of hardware 303, software, firmware or any combination thereof.

What is claimed is:

1. An engine control apparatus comprising:
   a purifying device provided in an exhaust pipe of a diesel engine;
   a fuel adding valve for supplying unburnt fuel into the purifying device; and
   an electronic control unit that executes temperature increase control of increasing a temperature of the purifying device to a target temperature in a temperature range in which a particulate matter burns by supplying unburnt fuel from the fuel adding valve, the electronic control unit is configured to:
      acquire a representative temperature that is a representative value of the purifying device at each predetermined control period;
      estimate an amount of SOx flowing into the purifying device as an inflow SOx amount at each control period;
      estimate a final adsorbed SOx distribution by using the inflow SOx amount and the representative temperature at each control period, the final adsorbed SOx distribution expressed as a graph in which an amount of SOx that finally adsorbs to the purifying device in each temperature during temperature increase of the purifying device is related with the representative temperature;
      estimate an amount of SOx that flows into the purifying device in a state of SOx and passes without adsorbing to the purifying device to be converted in a state of $SO_3$ as a passing $SO_3$ amount at each control period, by using the inflow SOx amount and the representative temperature;
      estimate a $SO_2$ reduction rate which is a ratio of reduction of $SO_3$ to $SO_2$ in the purifying device;
      calculate an amount of $SO_3$ that is allowed to desorb from the purifying device as an allowable desorption $SO_3$ amount at each control period, by using a constrained $SO_3$ amount at a downstream side of the purifying device, which corresponds to a constraint concerning sulfate white smoke, the passing $SO_3$ amount, and the $SO_2$ reduction rate; and
      calculate the target temperature at each control period, by using the final adsorbed SOx distribution and the allowable desorption $SO_3$ amount.

2. The engine control apparatus according to claim 1, wherein the electronic control unit is configured to estimate the $SO_2$ reduction rate based on a relation between the $SO_2$ reduction rate, a supplied amount of unburnt fuel from the fuel adding valve, and a gas amount flowing into the purifying device.

3. The engine control apparatus according to claim 1, wherein the electronic control unit is configured to:
   estimate a SOx saturation factor in the purifying device at each control period, by using an adsorbed SOx distribution expressed as a graph in which an amount of SOx that adsorbs to the purifying device in each temperature during temperature increase of the purifying device is related with the representative temperature of the purifying device and a saturation SOx distribution expressed as a graph in which an SOx maximum amount adsorbing to the purifying device in each temperature during temperature increase of the purifying device is related with the temperature of the purifying device;
   estimate an amount of SOx that flows into the purifying device and newly adsorbs to the purifying device as a newly adsorbing SOx amount at each control period by using the inflow SOx amount and the SOx saturation factor;
   estimate an amount of SOx that flows into the purifying device and passes without adsorbing to the purifying device as a passing SOx amount, by using the newly adsorbing SOx amount; and
   estimate the passing $SO_3$ amount at each control period, by using a conversion rate map expressing a relation between a conversion rate of $SO_2$ that is converted into $SO_3$ in the purifying device and the representative temperature.

4. The engine control apparatus according to claim 1, wherein the electronic control unit is configured to:
   estimate an amount of SOx that newly desorbs from the purifying device as a newly desorbing SOx amount at each control period, by using the inflow SOx amount and the representative temperature; and
   estimate the final adsorbed SOx distribution at each control period, by using the newly desorbing SOx amount.

5. The engine control apparatus according to claim 1, wherein the electronic control unit is configured to acquire a gas temperature at a downstream side of the purifying device as the representative temperature.

6. The engine control apparatus according to claim 1, wherein the purifying device includes a filter that traps particulate matter flowing in the exhaust pipe, wherein the electronic control unit is configured to start the temperature increase control when an estimated value of an amount of particulate matter trapped by the filter reaches a removal request amount.

* * * * *